(12) United States Patent
Johnson et al.

(10) Patent No.: US 7,870,360 B2
(45) Date of Patent: Jan. 11, 2011

(54) STORAGE AREA NETWORK (SAN) FORECASTING IN A HETEROGENEOUS ENVIRONMENT

(75) Inventors: Randy S. Johnson, OFallon, MO (US); Christopher M. Malone, Prescott Valley, AZ (US); Tedrick N. Northway, Wood River, IL (US)

(73) Assignee: International Business Machines Corporation, Armonk, NY (US)

( * ) Notice: Subject to any disclaimer, the term of this patent is extended or adjusted under 35 U.S.C. 154(b) by 649 days.

(21) Appl. No.: 11/855,422

(22) Filed: Sep. 14, 2007

(65) Prior Publication Data

US 2009/0077340 A1    Mar. 19, 2009

(51) Int. Cl.
*G06F 12/00* (2006.01)
(52) U.S. Cl. ...................................... 711/172; 711/112
(58) Field of Classification Search .................. 711/172, 711/112
See application file for complete search history.

(56) References Cited

U.S. PATENT DOCUMENTS

| | | | |
|---|---|---|---|
| 6,219,649 B1 | 4/2001 | Jameson | |
| 6,625,577 B1 | 9/2003 | Jameson | |
| 6,725,454 B1 | 4/2004 | Nagel et al. | |
| 6,957,201 B2 | 10/2005 | Alhadef et al. | |
| 7,194,538 B1 * | 3/2007 | Rabe et al. | 709/224 |
| 7,251,664 B2 * | 7/2007 | Fukuda et al. | 1/1 |
| 2003/0033180 A1 | 2/2003 | Shekar et al. | |
| 2004/0122647 A1 * | 6/2004 | Monroe et al. | 703/22 |
| 2007/0043860 A1 * | 2/2007 | Pabari | 709/224 |
| 2007/0214338 A1 * | 9/2007 | Mizuno et al. | 711/170 |
| 2008/0104350 A1 * | 5/2008 | Shimizu et al. | 711/165 |

* cited by examiner

*Primary Examiner*—Hashem Farrokh
(74) *Attorney, Agent, or Firm*—Anna L. Linne; Hoffman Warnick LLC

(57) ABSTRACT

The present invention provides an approach for SAN forecasting in a heterogeneous environment. Specifically, under the present invention capacity data on the heterogeneous environment is gathered. Capacity management techniques will then be used to analyze the SAN utilization, identify growth trends and patterns. Proactively, plans are made to account for these changes. Thereafter, a Capacity Planning Margin (CPM) will be applied to the forecast to reflect actual customer usage. The CPM adjusted forecasts will then be reviewed. Then, the SAN environment can be monitored by comparing actual vs. planned and return to adjust the forecast accordingly.

16 Claims, 3 Drawing Sheets

STORAGE AREA NETWORK (SAN) FORECASTING IN A HETEROGENEOUS ENVIRONMENT

FIELD OF THE INVENTION

The present invention generally relates to SAN forecasting. Specifically, the present invention relates to SAN forecasting in a heterogeneous environment.

BACKGROUND OF THE INVENTION

In a homogenous environment, a SAN storage vendor may have tools to identify storage usage down to the application level, such as IBM SAN Volume Controller for IBM SAN equipment (IBM, IBM SAN, and related terms are trademarks of IBM Corp. in the United States and/or other countries). As all allocation is known, forecasting can be performed following standard capacity management techniques. However, in a heterogeneous environment with multiple SAN vendors, as is seen in most outsourcing contracts, each storage vendor's tools do not inter-operate with other vendor's SAN, as their tool is seen as a competitive advantage.

Therefore, SAN environments are managed in a manual fashion and data collection for what is installed and allocated are difficult to collect. Given the lack of tool support, or the desire of an outsourced customer to reduced billed SAN usage, a discrepancy exists between the amount of storage allocated and the amount of storage actually installed. However, this utilized, but unallocated storage must still be included for accurate forecasts. In order to realize total cost of ownership, realized cost savings in newer technology an optimized plan for forecasting growth is critical in keeping cost down and avoiding. Unfortunately, no existing tool exists for providing such forecasting. In view of the foregoing there exists a need to a tool that solves at least one of the deficiencies in the related art.

SUMMARY OF THE INVENTION

In general, the present invention provides an approach for SAN forecasting in a heterogeneous environment that will aid in determining future growth requirements in a timely fashion, and meeting the customer's SAN storage expectation. Specifically, under the present invention, capacity data on the heterogeneous environment is gathered. This includes, but is not limited to, current configuration (installed SAN), SAN allocations, and SAN utilization. Then, a capacity forecast is performed by using capacity management techniques to analyze the SAN utilization, identify growth trends and patterns. Proactively, plans are made to account for these changes. Thereafter, a Capacity Planning Margin (CPM) will be applied to the capacity forecast to reflect actual customer usage. The CPM value as applied to storage categories may be adjusted to reflect growth patterns, but the overall SAN environment should reflect the CPM valuation. The CPM adjusted forecasts will then be reviewed (e.g., with management and finance) for approval so that any planning and installation of additional storage devices to support the workload can be performed. Then, the SAN environment can be monitored by comparing actual vs. planned and return to adjust the forecast accordingly.

A first aspect of the present invention provides a method for forecasting Storage Area Network (SAN) storage in a heterogeneous environment, comprising: gathering capacity data on the heterogeneous environment; performing a capacity forecast to analyze the SAN utilization and to identify growth trends and patterns; calculating a Capacity Planning Margin (CPM); and applying the CPM to the capacity forecast.

A second aspect of the present invention provides a system for forecasting Storage Area Network (SAN) storage in a heterogeneous environment, comprising: a module gathering capacity data on the heterogeneous environment; a module for performing a capacity forecast to analyze the SAN utilization and to identify growth trends and patterns; a module for calculating a Capacity Planning Margin (CPM); and a module applying the CPM to the capacity forecast.

A third aspect of the present invention provides a program product stored on a computer readable medium for forecasting Storage Area Network (SAN) storage in a heterogeneous environment, the computer readable medium comprising program code for causing a computer system to: gather capacity data on the heterogeneous environment; perform a capacity forecast to analyze the SAN utilization and to identify growth trends and patterns; calculate a Capacity Planning Margin (CPM); and apply the CPM to the capacity forecast.

A fourth aspect of the present invention provides a method for deploying a system for forecasting Storage Area Network (SAN) storage in a heterogeneous environment, comprising: providing a computer infrastructure being operable to: gather capacity data on the heterogeneous environment; perform a capacity forecast to analyze the SAN utilization and to identify growth trends and patterns; and calculate a Capacity Planning Margin (CPM); and apply the CPM to the capacity forecast.

A fifth aspect of the present invention provides a computer-implemented business method for forecasting Storage Area Network (SAN) storage in a heterogeneous environment, comprising: gathering capacity data on the heterogeneous environment; performing a capacity forecast to analyze the SAN utilization and to identify growth trends and patterns; calculating a Capacity Planning Margin (CPM); and applying the CPM to the capacity forecast.

A sixth aspect of the present invention provides computer software embodied in a propagated signal for forecasting Storage Area Network (SAN) storage in a heterogeneous environment, the computer software medium comprising instructions for causing a computer system to: gather capacity data on the heterogeneous environment; perform a capacity forecast to analyze the SAN utilization and to identify growth trends and patterns; calculate a Capacity Planning Margin (CPM); and apply the CPM to the capacity forecast.

A seventh aspect of the present invention provides a data processing system for forecasting Storage Area Network (SAN) storage in a heterogeneous environment, comprising: a memory medium having instructions; a bus coupled to the memory medium; and a processor coupled to the bus that when executing the instructions causes the data processing system to: gather capacity data on the heterogeneous environment; perform a capacity forecast to analyze the SAN utilization and to identify growth trends and patterns; calculate a Capacity Planning Margin (CPM); and apply the CPM to the capacity forecast.

BRIEF DESCRIPTION OF THE DRAWINGS

These and other features of this invention will be more readily understood from the following detailed description of the various aspects of the invention taken in conjunction with the accompanying drawings in which.

Figure 1:
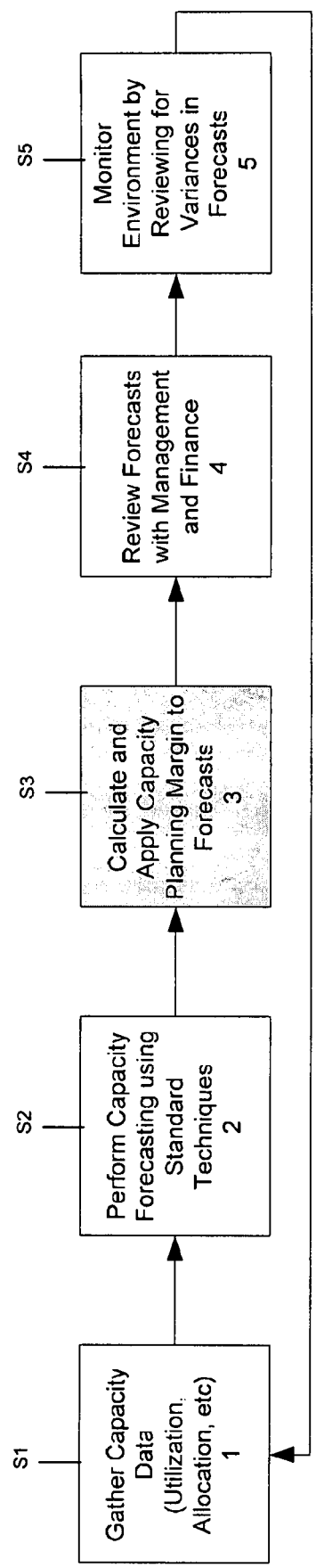
FIG. 1 depicts a method flow diagram according to the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

For convenience, the Detailed Description of the Invention has the following Sections:
I. General Description
II. Computerized Implementation I. General Description:

As indicated above, the present invention provides an approach for SAN forecasting in a heterogeneous environment that will aid in determining future growth requirements in a timely fashion, and meeting the customer's SAN storage expectation. Specifically, under the present invention capacity data on the heterogeneous environment is gathered. This includes, but is not limited to, current configuration (installed SAN), SAN allocations, and SAN utilization. Then, a capacity forecast is performed by using capacity management techniques to analyze the SAN utilization, identify growth trends and patterns. Proactively, plans are made to account for these changes. Thereafter, a Capacity Planning Margin (CPM) will be applied to the capacity forecast to reflect actual customer usage. The CPM value as applied to storage categories may be adjusted to reflect growth patterns, but the overall SAN environment should reflect the CPM valuation. The CPM adjusted forecasts will then be reviewed (e.g., with management and finance) for approval so that any planning and installation of additional storage devices to support the workload can be performed. Then, the SAN environment can be monitored by comparing actual vs. planned and return to adjust the forecast accordingly.

To this extent, normal capacity planning techniques are utilized to develop forecast models based on known allocations, including seasonality factors and multiple workload categories. This basis is adjusted by the new capacity function discussed herein. Along these lines the present invention includes the development of a key capacity function based on experiences with distributed storage. This function is called the Capacity Planning Margin (CPM) or CPM percentage (the Latent Growth Factor). Where distributed storage growth is tied to a specific workload within an environment and there is a large gap in the workload forecasting information. The teachings recited herein help ensure that the impact of this gap was minimized.

With the Capacity Planning Margin (CPM) value one would be able to adjust that percentage so as to adjust the forecasts to support actual utilization. The CPM can generally be inversely compared to an iceberg. In the reference account, about two thirds of the environment is known and the other third is hidden or unseen. This is due to the size of the environment and its complexity which makes it difficult to manage and gather information.

Before, the invention is discussed with reference to the Figs., some general rules of CPM development will be given:
Monthly growth will be constant with a pattern.
There will be constant gap between what is allocated and what is installed.

It is wise to set a limit as to what the forecast will include. Forecasts are based on historical/BAU information. Typically set a limit to the size of new unknown requirements that want to be placed into the environment as an emergency. Document a rule that states that any new unknown requirement that is 8% above your monthly forecasted growth is out of scope of the aligned forecast. This way protection will be in place from hidden requirements that become apparent.

Referring now to FIG. 1, a method flow diagram according to the present invention is shown. In step S1, capacity data on the heterogeneous environment is gathered. This includes, but is not limited to, current configuration (installed SAN), SAN allocations, and SAN utilization. In step S2, a capacity forecast is performed by utilizing capacity management techniques to analyze the SAN utilization and to identify growth trends and patterns. Proactively, plans are made to account for these changes. In step S3, the Capacity Planning Margin (CPM) is calculated and applied to the capacity forecast. In general, this calculation is as follows:

$$1-((\text{Allocated SAN}*\text{Allocation Threshold})/\text{SAN Install Base})$$

Where:
i. Allocated SAN=a sum of all SAN storage allocated to each Category
ii. Allocation Threshold=a Maximum desired utilization level
iii. SAN Install Base=a sum of all Installed SAN Storage
For clarity, the below example is presented with the following illustrative values:

SAN install base=500,000 GB.

Allocation Threshold=80%

Allocated SAN=400,000 GB

Using the algorithm set forth above, the CPM calculation would be as follows:

$$1-((400,000*0.80)/500,000)=1-(320,000/500,000)$$
$$=1-0.64=0.36, \text{ or } 36\%.$$

Once the CPM is applied to the capacity forecast, the CPM adjusted forecasts will be reviewed in step S4 (e.g., with management and finance) for approval, planning and installation of additional storage devices to support the workload can be performed. Then in step S5 the SAN environment can be monitored by comparing actual vs. planned storage and return to adjust the forecast accordingly.

Figure 2:
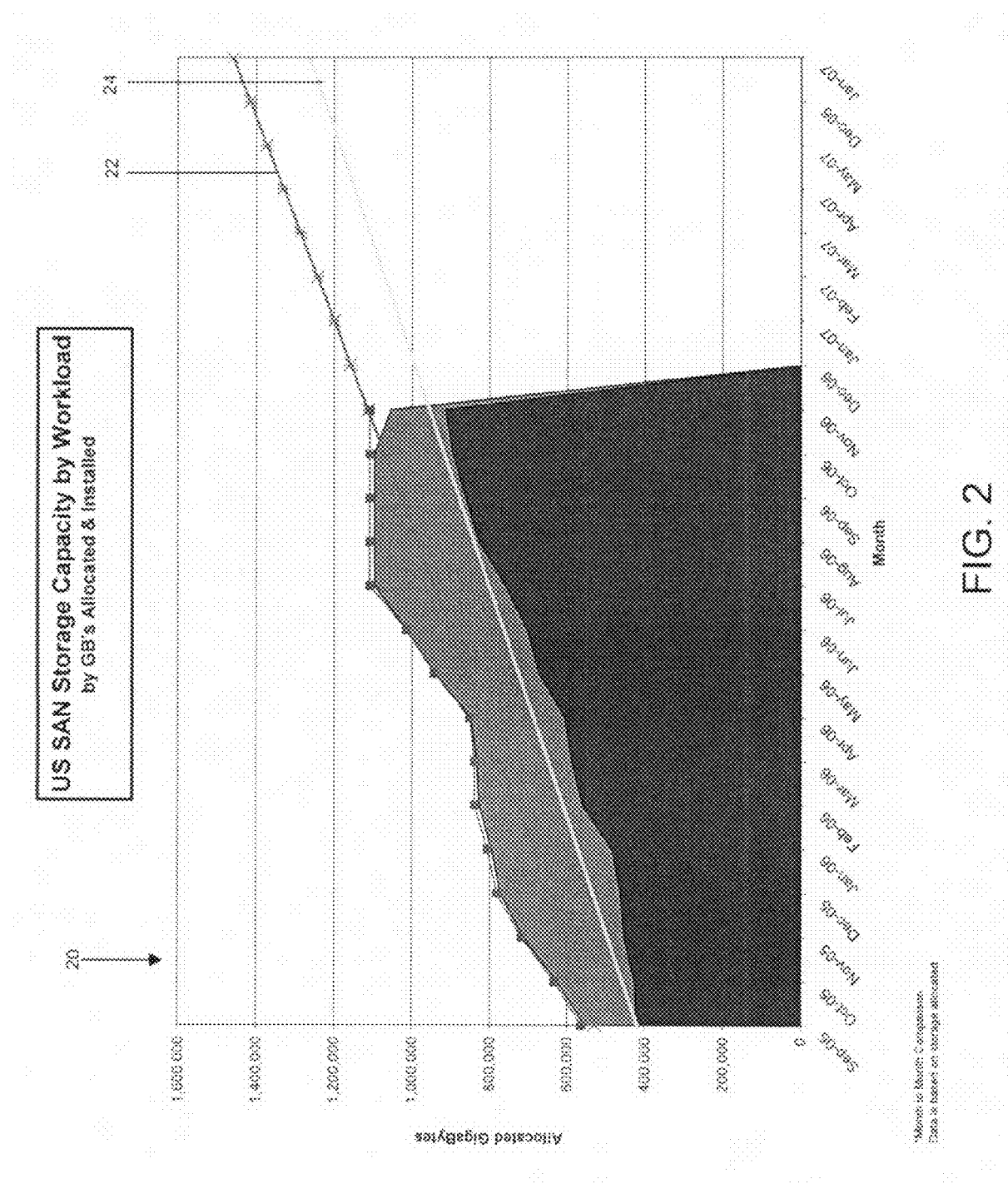
FIG. 2 depicts illustrative output according to the present invention.

In addition, the present invention can provide output in the form of charts, memoranda, etc. describing the forecast. Referring to FIG. 2, an illustrative chart 20 is shown. In chart 20, line 24 shows the trends following standard capacity forecasting techniques. Line 22 shows the CPM adjusted trend, which more accurately matches reality, and allows for better planning of the real SAN environment. As can be seen the teachings herein provide improved SAN forecasting and utilization.

Among other things, the present invention:

1. Allows accurate SAN forecasting in heterogeneous environment without accurate knowledge of all SAN usage.

2. Supports forecasting by overall enterprise or categories contained within the enterprise.

3. Minimizes panic buying due to proactive planning for the impact of unknown requirements.

4. For outsourcing, provides accurate forecasts without full information or support of the customers SAN usage.

5. Can be expanded to supporting NAS and Mainframe Storage.

II. Computerized Implementation

Figure 3:
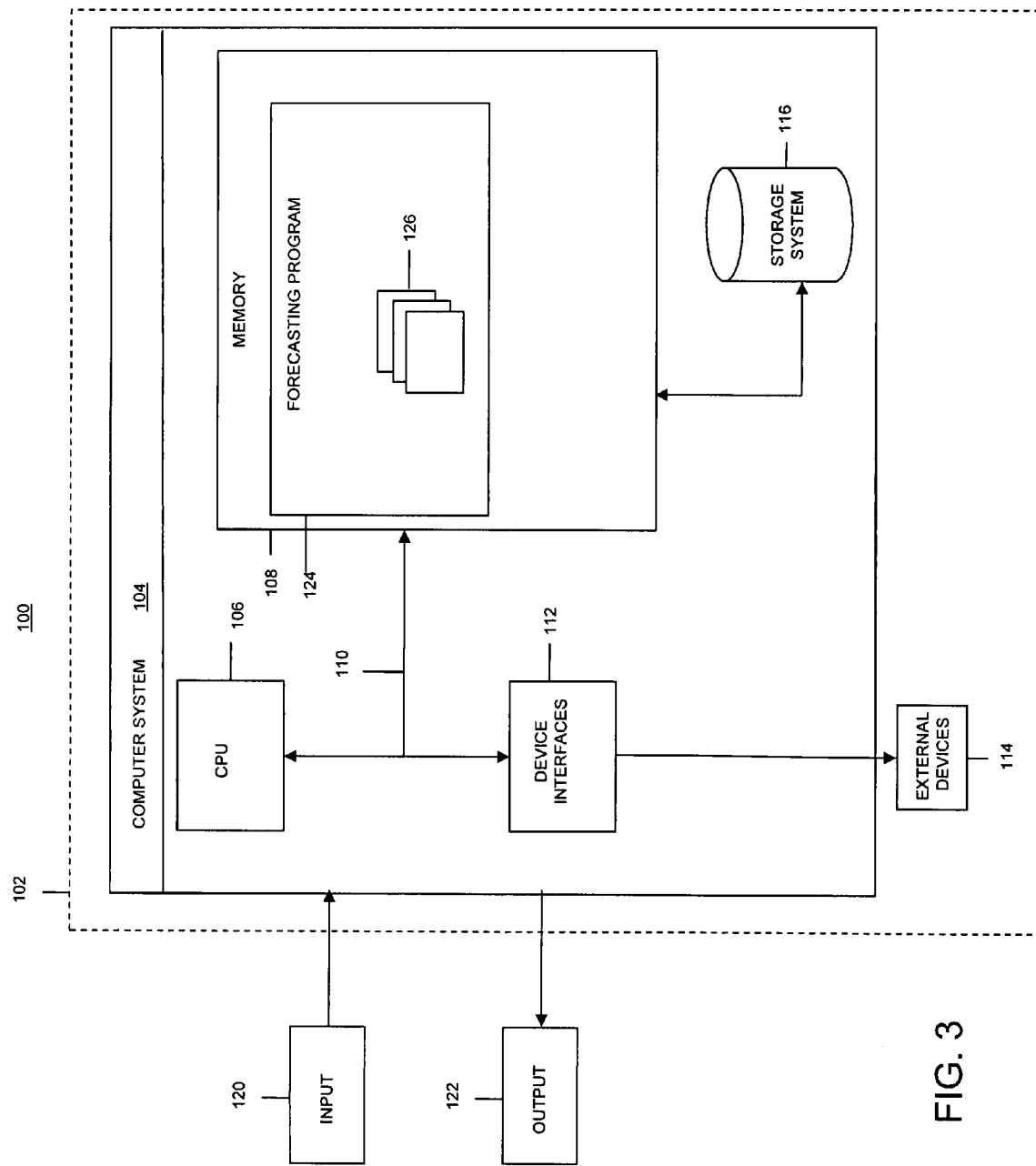
FIG. 3 depicts a more specific computerized implementation according to the present invention.

Referring now to FIG. 3, a computerized implementation 100 of the present invention is shown. As depicted, implementation 100 includes computer system/register 104 deployed within a computer infrastructure 102. This is intended to demonstrate, among other things, that the present invention could be implemented within a network environment (e.g., the Internet, a wide area network (WAN), a local area network (LAN), a virtual private network (VPN), etc.), or on a stand-alone computer system. In the case of the former, communication throughout the network can occur via any combination of various types of communications links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer infrastructure 102 is intended to demonstrate that some or all of the components of implementation 100 could be deployed, managed, serviced, etc. by a service provider who offers to implement, deploy, and/or perform the functions of the present invention for others.

As shown, computer system/register 104 includes a processing unit 106, a memory 108, a bus 110, and device interfaces 112. Further, computer system/register 104 is shown communicating with external devices 114 and storage system 116 that communicate with bus via device interfaces. In general, processing unit 106 executes computer program code, such as forecasting program 124 which is stored in memory 108 and/or storage system 116. While executing computer program code, processing unit 106 can read and/or write data to/from memory 108, storage system 116, and/or device interfaces 112. Bus 110 provides a communication link between each of the components in computer system/register 104. Although not shown, computer system/register 104 could also include I/O interfaces that communicate with: one or more external devices 114 such as a kiosk, a checkout station, a keyboard, a pointing device, a display, etc.); one or more devices that enable a user to interact with computer system/register 104; and/or any devices (e.g., network card, modem, etc.) that enable computer system/register 104 to communicate with one or more other computing devices.

Computer infrastructure 102 is only illustrative of various types of computer infrastructures for implementing the invention. For example, in one embodiment, computer infrastructure 102 comprises two or more computing devices (e.g., a server cluster) that communicate over a network to perform the various process of the invention. Moreover, computer system/register 104 is only representative of various possible computer systems that can include numerous combinations of hardware. To this extent, in other embodiments, computer system/register 104 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. Moreover, processing unit 106 may comprise a single processing unit, or be distributed across one or more processing units in one or more locations, e.g., on a client and server. Similarly, memory 108 and/or storage system 116 can comprise any combination of various types of data storage and/or transmission media that reside at one or more physical locations. Further, device interfaces 112 can comprise any module for exchanging information with one or more external devices 114. Still further, it is understood that one or more additional components (e.g., system software, math co-processing unit, etc.) not shown in FIG. 3 can be included in computer system/register 104.

Storage system 116 can be any type of system capable of providing storage for information under the present invention. To this extent, storage system 116 could include one or more storage devices, such as a magnetic disk drive or an optical disk drive. In another embodiment, storage system 116 includes data distributed across, for example, a local area network (LAN), wide area network (WAN) or a storage area network (SAN) (not shown). In addition, although not shown, additional components, such as cache memory, communication systems, system software, etc., may be incorporated into computer system/register 104.

Shown in memory 108 of computer system 104 is forecasting program 124, which a set of modules 126. The modules generally provide the functions of the present invention as described herein. Specifically (among other things), set of modules 126 is configured to: gather capacity data on the heterogeneous environment (shown as input 120); perform capacity forecasting by utilizing capacity management techniques to analyze the SAN utilization and to identify growth trends and patterns; calculate and apply a Capacity Planning Margin (CPM) to the capacity forecast; review the CPM adjusted forecasts (e.g., with management and finance) for approval, planning and installation of additional storage devices to support the workload; monitor the SAN environment by comparing actual vs. planned and return to adjust the forecast accordingly; generate and provide corresponding output 122.

While shown and described herein as SAN forecasting in a heterogeneous environment, it is understood that the invention further provides various alternative embodiments. For example, in one embodiment, the invention provides a computer-readable/useable medium that includes computer program code to enable a computer infrastructure to provide SAN forecasting in a heterogeneous environment. To this extent, the computer-readable/useable medium includes program code that implements each of the various process of the invention. It is understood that the terms computer-readable medium or computer useable medium comprises one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 108 (FIG. 3) and/or storage system 116 (FIG. 3) (e.g., a fixed disk, a read-only memory, a random access memory, a cache memory, etc.), and/or as a data signal (e.g., a propagated signal) traveling over a network (e.g., during a wired/wireless electronic distribution of the program code).

In another embodiment, the invention provides a business method that performs the process of the invention on a subscription, advertising, and/or fee basis. That is, a service provider, such as a Solution Integrator, could offer to provide SAN forecasting in a heterogeneous environment. In this case, the service provider can create, maintain, support, etc., a computer infrastructure, such as computer infrastructure 102 (FIG. 3) that performs the process of the invention for one or more customers. In return, the service provider can receive payment from the customer(s) under a subscription and/or fee agreement and/or the service provider can receive payment from the sale of advertising content to one or more third parties.

In still another embodiment, the invention provides a computer-implemented method for SAN forecasting in a heterogeneous environment. In this case, a computer infrastructure, such as computer infrastructure 102 (FIG. 3), can be provided and one or more systems for performing the process of the invention can be obtained (e.g., created, purchased, used, modified, etc.) and deployed to the computer infrastructure. To this extent, the deployment of a system can comprise one or more of: (1) installing program code on a computing device, such as computer system/register 104 (FIG. 3), from a computer-readable medium; (2) adding one or more computing devices to the computer infrastructure; and (3) incorporating and/or modifying one or more existing systems of the computer infrastructure to enable the computer infrastructure to perform the process of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic device system/driver for a particular computing and/or device, and the like.

A data processing system suitable for storing and/or executing program code can be provided hereunder and can include at least one processor communicatively coupled, directly or indirectly, to memory element(s) through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output or device devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems and Ethernet cards.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

We claim:

1. A method for forecasting Storage Area Network (SAN) storage in a heterogeneous environment, comprising:
   gathering capacity data on the heterogeneous environment;
   performing a capacity forecast to analyze the SAN utilization and to identify growth trends and patterns; and
   calculating a Capacity Planning Margin (CPM), the calculating comprising calculating the following algorithm:

$$1-((\text{Allocated SAN}*\text{Allocation Threshold})/\text{SAN Install Base})$$

Where:
   i. Allocated SAN=a sum of all SAN storage allocated to each of a set of categories;
   ii. Allocation Threshold=a maximum desired utilization level;
   iii. SAN Install base=a sum of all installed SAN storage; and
   applying the CPM to the capacity forecast.

2. The method of claim 1, further comprising:
   reviewing the capacity forecast after applying the CPM; and
   monitoring the heterogeneous environment for any variances in the capacity forecast.

3. The method of claim 1, further comprising generating output of the forecasting.

4. The method of claim 1, the output comprising at least one chart depicting storage trends.

5. A system for forecasting Storage Area Network (SAN) storage in a heterogeneous environment, comprising:
   a module gathering capacity data on the heterogeneous environment;
   a module for performing a capacity forecast to analyze the SAN utilization and to identify growth trends and patterns; and
   a module for calculating a Capacity Planning Margin (CPM), the module for calculating configured to calculate the following algorithm:

$$1-((\text{Allocated SAN}*\text{Allocation Threshold})/\text{SAN Install Base})$$

Where:
   i. Allocated SAN=a sum of all SAN storage allocated to each of a set of categories;
   ii. Allocation Threshold=a maximum desired utilization level;
   iii. SAN Install base=a sum of all installed SAN storage; and
   a module applying the CPM to the capacity forecast.

6. The system of claim 5, further comprising:
   a module for reviewing the capacity forecast after applying the CPM; and
   a module for monitoring the heterogeneous environment for any variances in the capacity forecast.

7. The system of claim 5, further comprising a module for generating output of the forecasting.

8. The system of claim 5, the output comprising at least one chart depicting storage trends.

9. A program product stored on a computer readable medium for forecasting Storage Area Network (SAN) storage in a heterogeneous environment, the computer readable medium comprising program code for causing a computer system to:
   gather capacity data on the heterogeneous environment;
   perform a capacity forecast to analyze the SAN utilization and to identify growth trends and patterns; and
   calculate a Capacity Planning Margin (CPM) using the following algorithm:

$$1-((\text{Allocated SAN}*\text{Allocation Threshold})/\text{SAN Install Base})$$

Where:
   i. Allocated SAN=a sum of all SAN storage allocated to each of a set of categories;
   ii. Allocation Threshold=a maximum desired utilization level;

iii. SAN Install base=a sum of all installed SAN storage; and apply the CPM to the capacity forecast.

10. The program product of claim 9, the computer readable medium further comprising program code for causing the computer system to:
   review the capacity forecast after applying the CPM; and
   monitor the heterogeneous environment for any variances in the capacity forecast.

11. The program product of claim 9, the computer readable medium further comprising program code for causing the computer system to: generate output of the forecasting.

12. The method of claim 9, the output comprising at least one chart depicting storage trends.

13. A method for deploying a system for forecasting Storage Area Network (SAN) storage in a heterogeneous environment, comprising:
   providing a computer infrastructure being operable to:
      gather capacity data on the heterogeneous environment;
      perform a capacity forecast to analyze the SAN utilization and to identify growth trends and patterns; and
      calculate a Capacity Planning Margin (CPM) using the following algorithm:

$$1-((\text{Allocated SAN} * \text{Allocation Threshold})/\text{SAN Install Base})$$

Where:
   i. Allocated SAN=a sum of all SAN storage allocated to each of a set of categories;
   ii. Allocation Threshold=a maximum desired utilization level;
   iii. SAN Install base=a sum of all installed SAN storage; and apply the CPM to the capacity forecast.

14. The method of claim 13, the computer infrastructure being further operable to:
   review the capacity forecast after applying the CPM; and
   monitor the heterogeneous environment for any variances in the capacity forecast.

15. The method of claim 13, the computer infrastructure being further operable to generate output of the forecasting.

16. The method of claim 13, the output comprising at least one chart depicting storage trends.

\* \* \* \* \*